J. B. GRIFFIN.

PERCOLATOR PUMP.

APPLICATION FILED APR. 19, 1916.

Reissued Jan. 9, 1917. 14,244.

*WITNESSES:*

Louis Lucia

Anne E. O'Brien

*INVENTOR.*

*John B. Griffin:*

*BY*

McHart

*his ATTORNEY.*

UNITED STATES PATENT OFFICE.

JOHN B. GRIFFIN, OF NEW BRITAIN, CONNECTICUT, ASSIGNOR TO LANDERS, FRARY & CLARK, OF NEW BRITAIN, CONNECTICUT, A CORPORATION OF CONNECTICUT.

PERCOLATOR-PUMP.

14,244. Specification of Reissued Letters Patent. Reissued Jan. 9, 1917.

Original No. 1,142,322, dated June 8, 1915, Serial No. 824,351, filed March 13, 1914. Application for reissue filed April 19, 1916. Serial No. 92,318.

*To all whom it may concern:*

Be it known that I, JOHN B. GRIFFIN, a citizen of the United States, and a resident of New Britain, in the county of Hartford, State of Connecticut, have invented a certain new and useful Improvement in Percolator-Pumps, and declare the following to be a full, clear, and exact description of the same, such as will enable others skilled in the art to which it pertains to make and use the same, reference being had to the accompanying drawings, which form a part of this specification.

My invention relates to percolator-pumps for coffee pots, etc., and consists in the structure, arrangements, and combinations hereinafter described and claimed.

Figure 5:
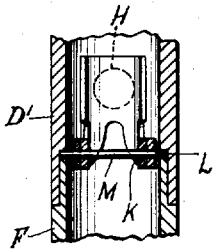
Figure 1:
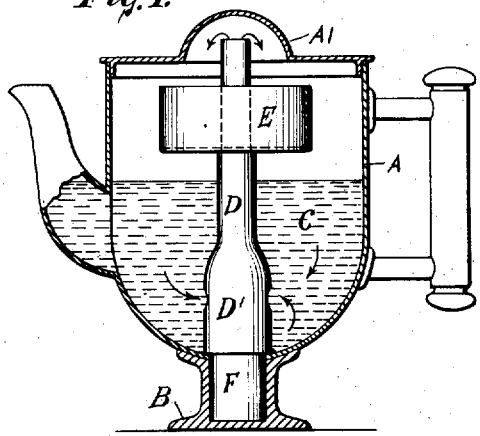
Figure 4:
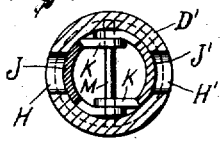
Figure 2:
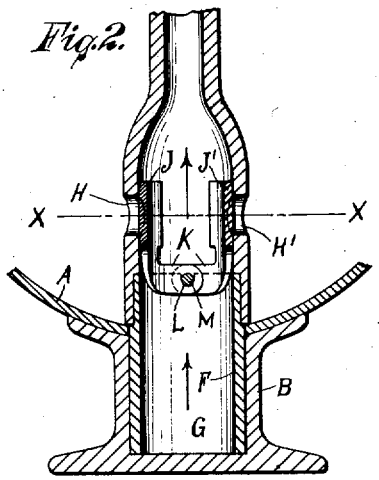
Figure 3:
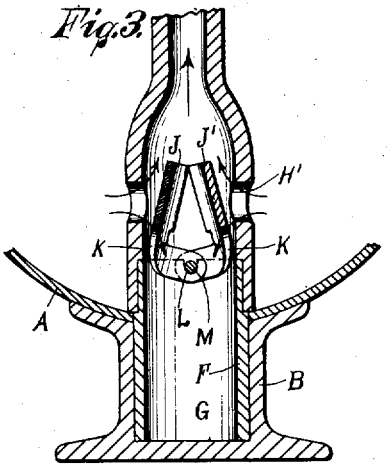

In the drawings Figure 1 is a partial vertical section of a receptacle such as a coffee pot adapted to be heated at the bottom by electrical means or otherwise and containing my invention. Fig. 2, is a vertical section of the lower part of the percolator pump and base of the receptacle containing it showing the valves hereinafter described, in the closed position. Fig. 3 is a similar vertical section of the same parts but with the valves in the open position. Fig. 4 is a cross section on the line X—X of Fig. 2. Fig. 5 is a vertical section of the valves at right angles to that of Figs. 2 and 3.

In the drawings similar letters refer to similar parts.

In the drawings A is the body of a vessel containing my improvement usually that of a coffee pot.

B is the base thereof and which in itself is adapted to be heated, but as such means of heating especially electrically are old and in common use, it is entirely unnecessary to either illustrate or describe them. It suffices to say that the heat is supplied to the base B.

C is shading representing the liquid in said receptacle A.

D is the percolator pump.

E is the receptacle to receive the liquid from the upper end thereof. As there is nothing novel and as it constitutes no part of my invention in the particular feature illustrated by E, it is unnecessary to describe it.

My invention resides in the construction shown in Figs. 2, 3, 4 and 5. In this construction D′ is the wall of a lower part of a pump which is suitably erected upon a base piece F. This extends below the bottom of the receptacle A and forms a chamber for liquids at G. Two perforations H and H′ are made upon either side of the wall D′, which perforations are normally closed by valves, which are marked J, J′, of a peculiar shape and operation. The form of the valves J, J′ is illustrated in the four Figs. 2, 3, 4 and 5. Each valve consists of a semi-circular piece adapted to fit closely in the circular interior of the part D′, so closely as to be practically liquid-tight, and when adjacent to and covering the holes H, H′, prevents the escape of liquid therethrough. Each valve has two depending legs of a curved shape as shown at K, K, and they are loosely journaled at L upon a pin M passing into the wall of each side of the part D′. Their normal position in view of their weight would be that shown in Fig. 2 with the orifices H and H′ closed, but they are capable of being forced inwardly in the position shown in Fig. 3, so that the orifices H and H′ are open. It will be observed that the valves J, J′, are held in this position as shown in Fig. 2 by their gravity as they are supported upon the pin M, and that they are caused to swing inwardly by a force which must overcome this gravitational tendency to hold the position shown in Fig. 2. When the receptacle is filled with liquid the pressure of the liquid forces the valves J, J′, inwardly and the liquid passes through the orifices H, H′, filling the tube D and also the receptacle G. When this liquid is heated by heat applied to the lower part of the receptacle, the liquid therein expands and is of course pushed upwardly. As the liquid is expelled from the lower end or receptacle G, more liquid enters by the opening of the valves, and the process is repeated. Liquid thereupon is forced out from the upper end of the tube D against the top A′ of the receptacle A and falls into the receptacle E. As a result of this arrangement of the valves and the position of their support relative to the well or chamber *g* and the orifice *h*, the tendency of the normal operation of the pump is to close the valve tightly against the orifice as the liquid expands and moves upward from the well, thus maintaining the valves in proper position during this period to prevent the escape of the hot water or steam through the orifice.

Thus a very efficient percolator pump is produced, one that it easy to take apart and clean, and one that is practically not liable to get out of order.

I claim as my invention:—

1. In a percolator pump, the combination of a vertical tube provided with an orifice in its side and valve comprising the part of a tube adapted to fit the inside of said tube and having a depending leg or stem projecting angularly from the tubular part, and means near the center of the tube for pivotally supporting the free end of the leg or stem, the center of gravity in the entire valve being so located that the valve normally rests against the inside of the tube and closes the orifice, substantially as described.

2. In a percolator pump, the combination of a vertical tube provided with oppositely disposed orifices, a pin running crosswise of the tube near its axis, said pin being located below said orifices, and a pair of part tubular valves, each provided with an angularly extending and depending leg or stem pivotally mounted on said pin, the center of gravity of the valves being so arranged as to normally cause the valves to hold against the inside of the tube and close the orifices.

3. In a percolator pump, a well, an inlet thereto, an outlet therefrom, a valve for said inlet located in the path of movement to the outlet, and a support for said valve located between the bottom of said well and said inlet.

4. In a percolator pump, a chamber having an orifice in its side wall, a valve located within said chamber and gravity-actuated to normally close said orifice, and a support upon which said valve is free to rock located between said orifice and the bottom of the chamber, whereby the upward movement of the contents of the chamber acts upon and tends to close said valve against the orifice.

5. In a percolator pump, a vertical tube provided with an orifice, a closure for said orifice within said tube, a well below the orifice, circumferential extensions from the lower edge of both sides of the closure terminating at substantially opposite points, and supporting means on said tube between the bottom of said well and said orifice and with which said extensions are engaged.

6. In a percolator pump, a vertical tube, supporting points on the inner surface of said tube substantially opposite one another, an orifice in said tube above said supporting points, a well below said supporting points, a closure for the orifice, and oppositely disposed extensions at the lower part thereof carried by and rocking on said supporting points.

JOHN B. GRIFFIN.

Witnesses:
B. W. Clark,
M. W. Sanderson.